May 19, 1936.   D. A. NEVIN   2,041,085
KEY CARD PUNCH
Filed March 21, 1935   8 Sheets-Sheet 1

INVENTOR.
Donald A. Nevin
BY Harry Leal Dodson
ATTORNEY.

May 19, 1936.    D. A. NEVIN    2,041,085
KEY CARD PUNCH
Filed March 21, 1935    8 Sheets-Sheet 2

INVENTOR.
Donald A. Nevin
BY Harry Lea Dodson
ATTORNEY.

May 19, 1936. D. A. NEVIN 2,041,085
KEY CARD PUNCH
Filed March 21, 1935 8 Sheets-Sheet 3

INVENTOR.
Donald A. Nevin
BY Harvey Lea Dodson.
ATTORNEY.

May 19, 1936.  D. A. NEVIN  2,041,085
KEY CARD PUNCH
Filed March 21, 1935  8 Sheets-Sheet 6

INVENTOR.
Donald A. Nevin
BY Harry Lea Dodson
ATTORNEY.

May 19, 1936.                    D. A. NEVIN                    2,041,085
                                KEY CARD PUNCH
                  Filed March 21, 1935           8 Sheets-Sheet 7

INVENTOR.
Donald A. Nevin
BY Harry Lea Dodson
                ATTORNEY.

May 19, 1936.         D. A. NEVIN         2,041,085
KEY CARD PUNCH
Filed March 21, 1935         8 Sheets-Sheet 8

INVENTOR.
Donald A. Nevin
BY Harvey Lea Dodson
ATTORNEY.

Patented May 19, 1936

2,041,085

UNITED STATES PATENT OFFICE 2,041,085

KEY CARD PUNCH

Donald A. Nevin, Athens, Ohio, assignor to The McBee Company, Athens, Ohio, a corporation of Ohio Application March 21, 1935, Serial No. 12,142

19 Claims. (Cl. 164—112)

My invention relates to that class of key card punches which are designed to notch cards which are to be used in connection with the keysort filing system described in United States Letters Patent No. 1,544,172, issued to A. Perkins. Cards of these systems are necessarily limited in area, as a consequence, it is desirable to codify the subject matter on the cards thereby greatly increasing their scope and utility.

As appears from an inspection of the said Perkins patent a plurality of holes are punched adjacent the periphery of the cards and then these holes are notched out to the edge of the card so as to provide the desired separation. Key punches which are now in use for notching cards of this type are usually provided with a quantity of punches each actuated by a single key. Some of these provide for enough punches and keys to notch all of the cards required in a row on the card. Others provide for the card to move after a notch is punched to a position for punching the next notch in the row, an escapement being provided which is similar to a typewriter wherein the paper moves for spacing the letters in a word.

Figures 1, 17:
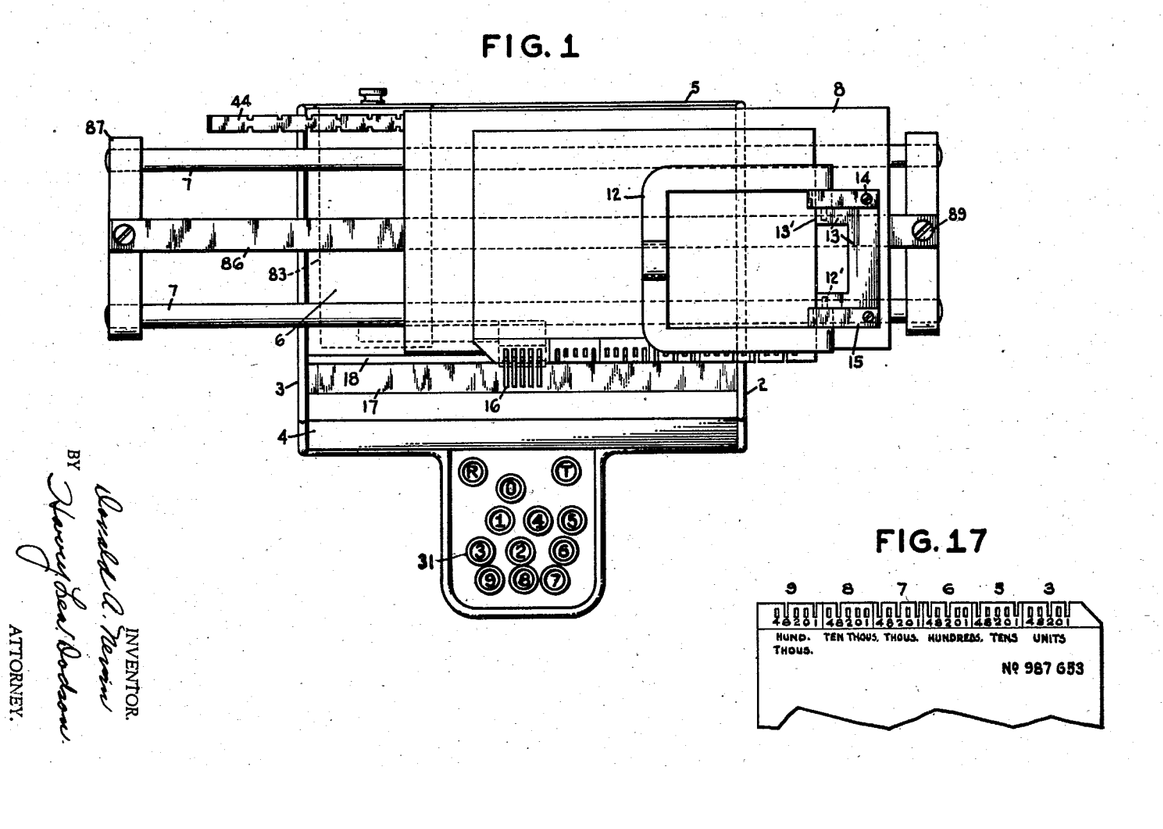
Fig. 1 is a top plan view of my invention with card in place and slots all punched.
Fig. 17 shows a type of card which has been perforated. Similar reference numerals refer to similar parts throughout the entire description.

It is highly desirable on cards of this type to punch as many slots or holes as possible in a given space; also to employ various combinations of five perforations; for example, to represent the ten digits, thus obtaining a greater number of controls in a given space than would be possible when using a hole or slot for each of the ten digits. A card of this type is shown in Fig. 17, the usual procedure being to perforate all holes at the time the card is manufactured and for the user to notch the margin of the cards opposite certain holes as desired.

My invention has for its object to provide a key operating device, having five cutting punches, which are operated and controlled in various combinations by a full set of 10 keys usually numbered from 0 to 9 inclusive, although it will be obvious to persons skilled in the art that various other indicia such as letters and symbols may be used either singly or in combination. In the illustration of the card, it has been notched to represent a commodity whose number is 987653. The digit 3 is obtained by the combination of 1 and 2; the digit 7 is obtained by the combination of 1, 2, 4 etc. While the single number in this case is 8, other single numbers are 0, 1, 2, and 4.

My means of accomplishing the foregoing objects may be more readily understood by having reference to the accompanying drawings which are hereunto annexed and are a part of this specification, in which—

As shown in the drawings, the device is provided with a frame clearly seen in Figs. 1, 2, 3 and 4, which embodies a preferred construction. The frame includes a base 1, which is rigidly secured to the key board frame, right, and left side plates 2 and 3, which may be made of either cast metal or sheet metal if desired, there being enclosed by front and rear sheet metal covers 4 and 5 and a top 6. The base is provided with a plurality of upwardly extending lugs which may be cast integral with the base or attached thereto by means of screws or in any other suitable or convenient manner. A pair of these lugs are indicated by reference numerals 1' and 1'' in Figs. 4 and 12, and support the slotted bar 20 and guide bar 21 which form guides for the punches as hereinafter described. They are also used to support various mechanisms as hereinafter set forth as well as to support tracks 7 upon which a card table 8 rolls. This table 8 is provided with a clamp 12, Fig. 1, to hold in place the mounted card which is laid flat upon it, and with end brackets 11 which form bearings for shafts 10 to which are fixedly secured rollers 9 which rest upon the track formed by the two rods 7.

The clamp 12 is pivoted on trunnions 12'. These trunnions are journalled in blocks 13 which are preferably attached to the table 8 by screws 14. These screws also serve to retain flat springs 15 in place. These springs bear upon the clamp 12 to hold the card in contact with the table 8. In order to insert the card the clamp 12 may be raised slightly as indicated by the dotted lines in Fig. 2 or it may be raised 90 degrees in which case it will be retained in an approximately vertical position because of the pressure of the flat spring 15 bearing down upon the edges 12''. The edge of the card which is to be notched is located toward the front which is passed under the upper hook shaped end of the punches 16 and contacts a step 17' to a die 17 which will be hereinafter described. Means for holding the card against endwise movement comprises a stop 13' formed on the block 13. The die shown in Figs. 1, 4, 6 and 13 is made in two parts 17 and 18 which are joined together by a U-shaped piece 19, as shown in cross section Fig. 13. Both die pieces have five slots to guide the punches 16 and also to provide cutting edges. It will be apparent to persons skilled in the art that the number of slots as well as the number of punches employed may be varied. The die pieces 17 and 18 extend the width of the device and are suitably supported by the posts 1'' of Fig. 4. Preferably, I form the front die of greater thickness than the rear and upon this thickened portion I provide a step or portion 17' against which the front edge of the card abuts. I have also found it desirable in practice to provide a step on the upper surface of the rear die 18 so as to bring the upper surface of the card table 8 flush with it. From this description it will be clear that the margin of the card which is to be slotted will extend beyond the table and over the slotted portion of the rear die and underneath the punches 16. The slots in the front die 17 are not used for cutting, but for guiding the punches 16 at the top. The lower ends of the punches 16 are guided in the slotted bar 20 which is supported at the ends by offset portions of the posts 1''. The punches are guided at the rear by means of a plate 21 which is supported at its ends by the posts 1''. The punches 16 are retained in their normal upper position by means of tension springs 22, the upper ends of which are attached to spring clips 23 which are fastened to U block 19, their lower ends being attached to punch rockers 24, one being provided for each punch. These punch rockers are pivotally connected to the punches by pins 25 and all of them are mounted on a shaft 26 which is fixedly secured to the lug or posts 1'.

Figures 4, 5:
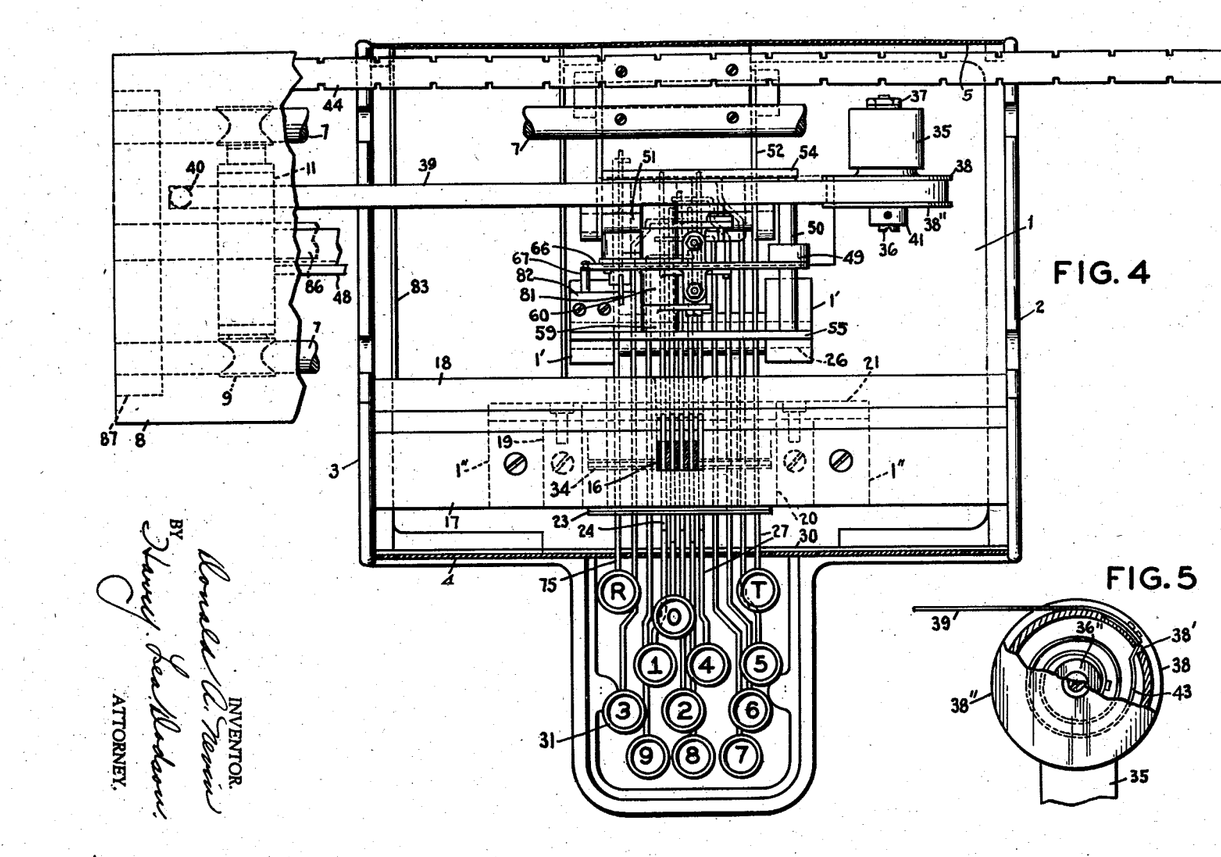
Fig. 4 is a plan view with certain parts broken away and sectional for clarity.
Fig. 5 is a detail view of the spring drum for operating the card table.
Figure 7:
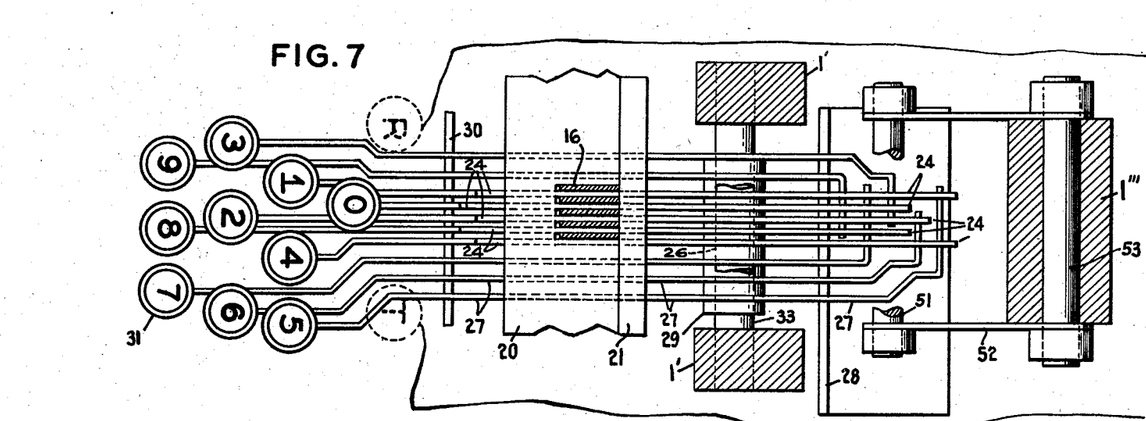
Fig. 7 is a detail plan view of the key punching mechanism.
Figure 8:
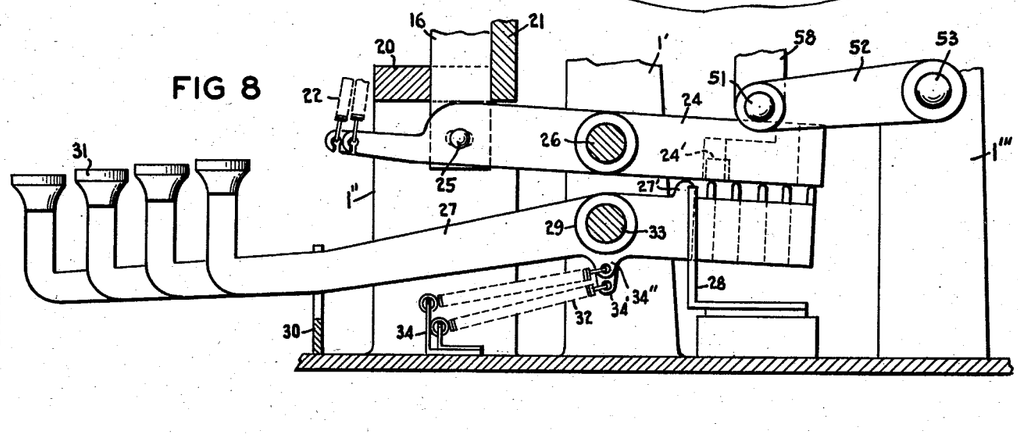
Fig. 8 is a detail side view of the key punching mechanism shown in Fig. 7 partly in section for clarity.

It will be apparent that there will be a radial motion of the rockers when the shaft is rocked and this must be compensated for in order to have it synchronized with the longitudinal motion of the punches 16. I accomplish this by slightly elongating holes through which the pin 25 passes, the elongation being lengthwise of the rocker. It will be clear from the foregoing that the punches are limited in their upward movement by the front upper edge of the rockers contacting with the lower edge of plate 21. The rear end of the rockers 24 are of various lengths, and shapes, to permit certain rockers to contact with the rear end of certain key levers 27 and to clear certain other key levers. Those key levers which will operate only one rocker and its attached punch, are the numbers 0, 1, 2, 4, and 8, as shown in Figs. 4, 7 and 8, where they are so numbered when a numerical system is employed. In other cases the keys may be marked with letters or other indicia. As shown in Figs. 7 and 8, a key lever is provided with a projection 27', which contacts with that rocker 24 which is located directly above it. In order to insure this registration, I provide means for guiding the rocker in slots formed in a metal comb 28 shown in Figs. 7 and 8. It may be attached by means of screws or any other convenient manner to the bed plate of the frame. In each key lever I insert a hub bearing 29 which is fitted tightly in the lever and these, together with an additional comb 30, which is located at the lower front and just under the cover 4 serves to provide additional means for insuring the alinement of the key lever with the rocker. Key buttons 31 are provided at the forward extremities of the key lever. The keys are retained in their nomal upper position, with the key lever contacting the lower edge of the front cover 4, by means of tension springs 32. One end of each spring is attached to spring clips 34 which are fixedly secured to the base. The other ends of the springs are attached to either a long eyelet 34' or the short eyelet 34'' which forms an integral part of the key lever. This construction insures the springs clearing one another when the keys are spaced a distance less than the required diameter of the springs. It also serves to compensate for the variation in pressure required to depress the key buttons 31 due to the long key levers requiring less pressure to operate them than is required by the short ones. This is accomplished by providing the two shorter key levers with short projections for the spring eyelets while the rocker key levers are provided with longer projections. All of the key levers are rockable on the pin 33 which is fixedly secured to posts 1'. It will be clear from the foregoing description that the depression of a key will cause the key lever to rock on the pin 33 and thus impart a similar motion of the rocker 24 on the pin 26 and this in turn will positively lower its connecting punch. Since there is no connection between the key lever and the rocker except the contact of lug 27' with the rocker, it is possible to operate more than one punch with only one key lever by shaping the rear terminal of the same in such a manner that it contacts more than one rocker arm 24 and clears others. As the operation of the key levers 3, 5, 6, 7, and 9 are the same the operation of key lever 3 will apply to the others.

As shown in Figs. 7 and 8, the operation of key No. 3 motivates both the number 1 and the number 2 rocker arm. The operation of the No. 3 key motivates both the No. 1 rocker and No. 2 rocker without disturbing the No. 1 or No. 2 key lever which, as previously stated, are related to the rockers 24 by contact only. The No. 3 key lever at its rear terminal is bent inwardly to extend under the No. 2 rocker as well as the No. 1 rocker and is, therefore, directly under the No. 0 rocker located between the two, but the latter is cut away at its lower rear terminal, so as not to be affected by operation of the No. 3 key lever, nor of the No. 7 or No. 9 which are also bent to extend under it.

The No. 5 key lever is arranged to operate No. 1 and No. 4 rockers without interfering with any of the others.

The No. 6 key lever arranged to operate No. 4 and No. 2 rockers without interfering with any of the others.

The No. 7 key lever arranged to operate Nos. 4, 2 and 1 rockers, the rear terminal of which also passes under rockers No. 0 and No. 8, which are cut away to clear the No. 7 key lever as shown in Fig. 8.

The No. 9 key lever arranged to operate the No. 1 and No. 8 rockers also passes under rockers No. 0 and No. 2, the former being cut away to clear as above described and the latter notched at 24' to clear the No. 9 key lever Fig. 8, but still provide contacting surface for Nos. 2, 3, 6 and 7 key levers.

The downward stroke of the key levers is limited by contact of the lower edge with the bottom of the slot in the comb 30.

Figure 6:
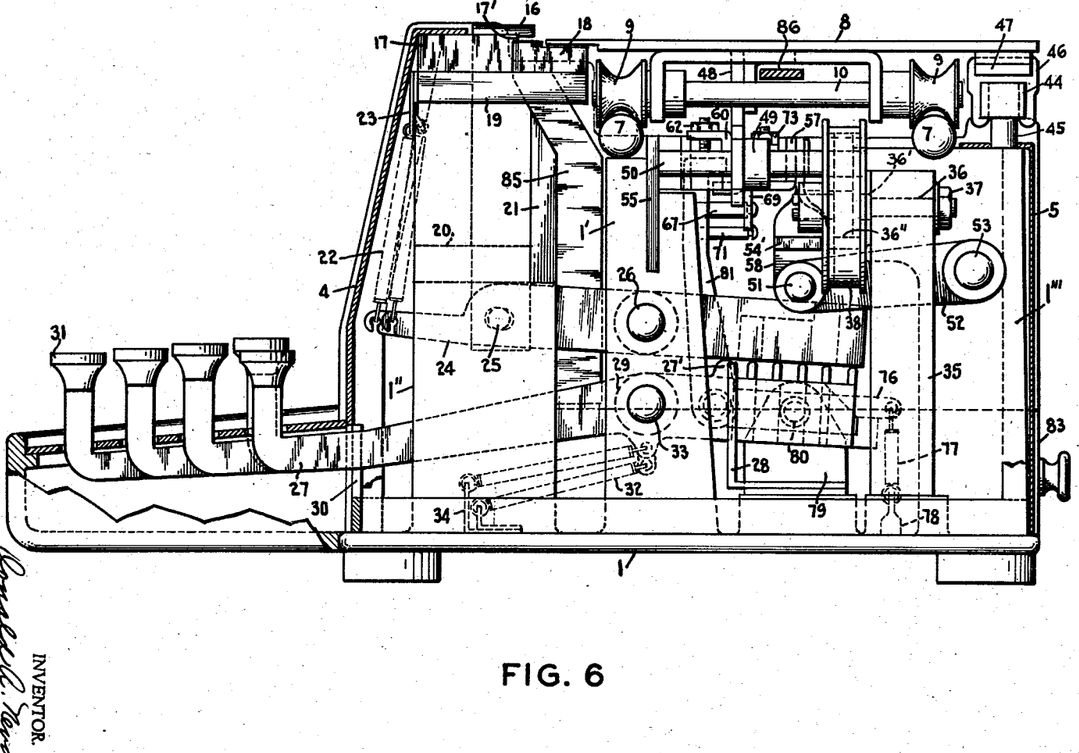
Fig. 6 is an end view with certain parts broken away and sectional for clarity.

The means which I have provided for moving the card table 8 and its carriage from left to right is clearly seen in Figs. 4, 5, and 6. A post 35 is attached to or cast integral with the base 1. In its upper end I mount a spindle 36 which may be clamped to prevent turning by tightening a nut 37 which operates to draw the shoulder formed by a larger diameter 36' against the face of the post 35. Turning freely on this shoulder 36' but retained by a still larger shoulder 36'' which forms the spindle of the device is a drum 38. One end of a clock spring 43 is attached to the spindle 36 by means of a screw as illustrated, while the other end passes through a slot in the rim as shown at 38' and is retained by the screw as shown in the drawings. This screw serves also to attach the end of a cloth or metal tape 39 which has its other end attached to post 40 which is rigidly secured to the card table 8. A lid 38'' covers the drum 38 and retains the spring 43 in its housing. It also turns freely on the spindle 36 and is retained thereon by means of a collar 41 which is held by a set screw 42. Normally, the tension of the spring 43 holds the table 8 and its carriage at the extreme right hand side of the device and against a stop hereinafter described. The movement of the table 8 toward the left hand side operates to unwind the tape 39 from its drum 38 thereby winding the spring 43 around the spindle 36.

It may, in some instances, be found desirable to either increase or decrease the tension 43. This may be done by turning the spindle 36 to the right or left by means of a screw driver and then clamping it by tightening the nut 37. The stop bar 44 is preferably mounted in the rear portion of the interior of the base and on top of posts 1''' which may be cast integral with the base or attached thereto by means of screws. The stop bar rests upon collars 45 which provide clearance for the "Hairpin" stops 46 which are similar to those used on standard typewriters for tabulator stops. The stop bar 44 may be attached by screws as shown in the drawings or in any other suitable manner. The bar has a series of opposing slots which receive the stop 46 for the purpose of limiting the right and left hand travel of the card table 8. The bumper block 47 may be attached permanently or adjustably to the card table. One object of the stop 46 is to limit the table travel according to various lengths of cards right to left and another object is to provide means for positively locating the table and card when it is desired to punch only a portion thereof. The card shown in Fig. 17 is manufactured with round, square or rectangular holes punched in one or more margins. The apertures as shown in this figure are arranged in groups of five though it will be apparent to persons skilled in the art that this arrangement may be varied to suit the requirement. As illustrated, the device has been used for notching the cards to open the apertures through the edge. Each slot or combination of slots represents a digit of a number which in the example shown is 987653. The numeral 3 is a combination of 1 and 2. In the "tens" group the combination of slots 1 and 4 result in 5 and in the "hundred" groups 4 and 2 result in 6, etc. The card is first placed on the table face up, top toward the front, as in this example the punching has already been done. In the card illustrated, it is punched with nine hundred thousand and ends with the unit 3. All the slots required for one group are punched simultaneously. The card and the table 8 is then moved by the spring 43 as above described so as to position the next group under the punches. The rack 48 shown in Figs. 1, 10, 11, 13, 14, 15 and 16 is attached permanently to the card table 8 and has teeth spaced to correspond to the distance on the card from one group of holes to an adjoining group. A stop pawl 49 which is permanently attached to an oscillating shaft 50 engages one of these teeth while a key is being depressed and is released when the key returns to its normal position, being withdrawn by a tension spring hereinafter described. The rear upper end of all of the rockers 24 in moving upwardly contact with a rod 51 which is supported and attached at both ends by arms 52 which extend rearwardly to receive the ends of an oscillating shaft 53 to which they are permanently secured, thus forming a rectangle. The shaft 53 has a bearing in the post 1''', this bearing being straddled by the arms 52. The oscillating shaft 50 is supported at its rear end by a bearing plate 54 Figs. 12 and 13, and at its front by a bearing plate 55. Both of these bearing plates 54 and 55 are securely attached to posts which extend upwardly from the base 1 of the machine. In these bearing plates is mounted another oscillating shaft 56 which is mounted parallel to and in the same plane as shaft 50. The arm 57 is adjustably secured to the shaft 56, for the purpose of imparting motion from the rod 51, by means of connecting link 58 with an upper terminal pivotally attached to the former and the lower end of the link 58 pivotally attached to the latter, the link being guided in a slot in the end and forwardly extending portion 54' of bearing plate 54. It will be seen from the foregoing that the motion of rod 51 is imparted to shaft 56 and from it to shaft 50, the return motion being effected by a tension spring 70. An arm 59 is permanently attached to the shaft 56 in a position approximately parallel to the arm 57. Located between the two arms is a third arm 60 which is adjustably secured to the shaft 56 by connection of the arms 59 through the medium of adjustable screws 61 and lock nut 62, the screw being carried by an overhanging portion of the arm 60 as well as the swivel 63 which is mounted in arm 59 and retained in position by a lock nut 64 clearly seen in Figs.

Figure 12:
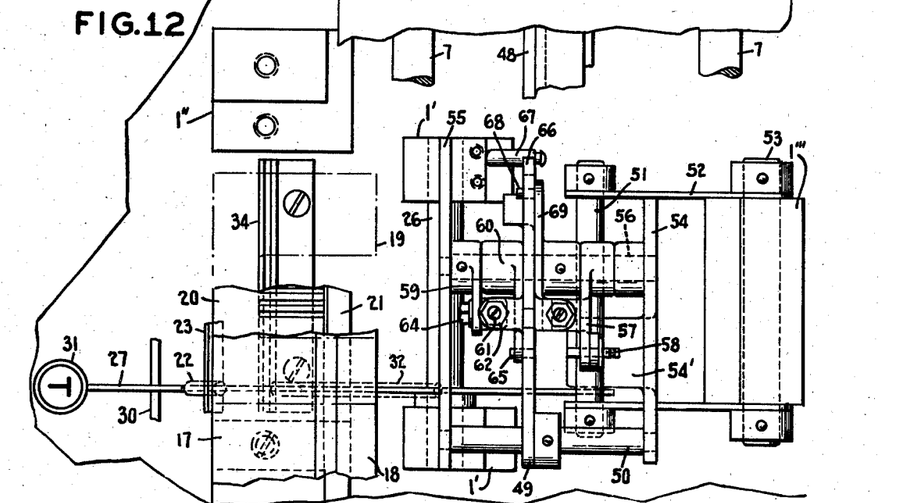
Fig. 12 is a fragmentary plan view of the tabulating key and mechanism for moving the table carriage from one group of numbers under the punches to another group of numbers without operating any of the punches.
Figure 13:
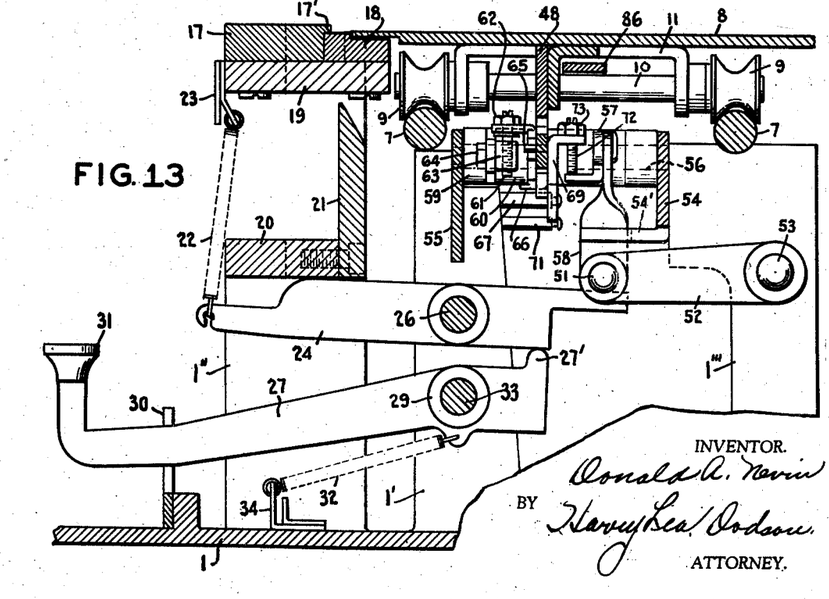
Fig. 13 is a fragmentary sectional view of the same.
Figure 14:
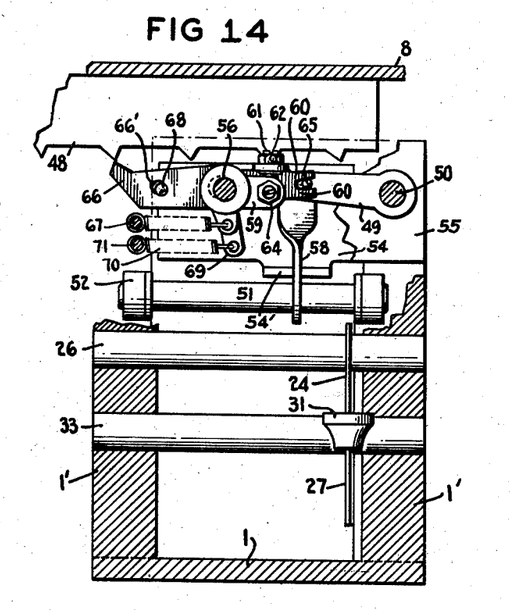
Fig. 14 is a fragmentary front elevation partly in section of the tabulating key and its mechanism.
Figure 15:
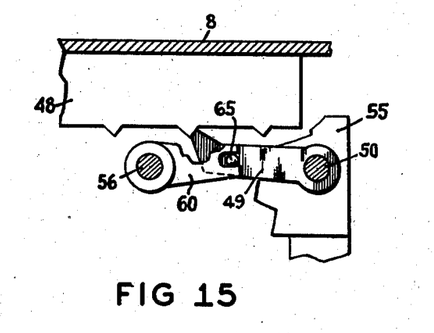
Fig. 15 is a fragmentary detail view of the stop pawl.
Figure 16:
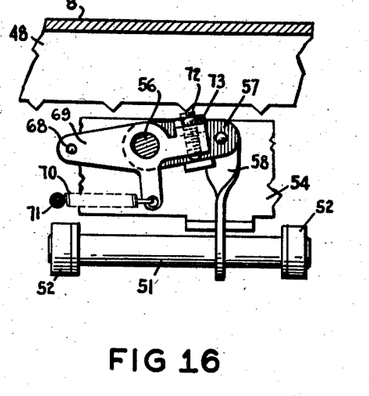
Fig. 16 is a fragmentary detail view of the escapement.

12 and 13. The end of the arm 60 is notched to receive a pin 65 which is integral with or otherwise rigidly secured to stop pawl 49. From the foregoing it will be apparent that the relative position of the stop pawl 49 to the arm 60 may be controlled by the adjustment of the screw 61 so that the toothed end of the stop pawl 49 will remain engaged with the bottom of the rack 48 as shown in Fig. 15, until the punch or punches 16 have been withdrawn after cutting the card. In this manner I prevent any premature escapement of the table. Upon the withdrawal of the stop pawl 49 and the subsequent escapement of the table 8, the escapement pawl 66 which has been raised upon the top of the racked tooth will be elevated at the toothed end so as to reach the bottom of the racked teeth. It is actuated by a tension spring 67 which rocks it on the shaft 56 when the table 8 is moved in its escapement a sufficient distance for the next tooth to engage with the face of the tooth on the end of the escapement pawl 66, the force of the power spring 43 which actuates the table 8 will cause the escapement pawl 66 to move to the right a distance equal to the elongation of its bearing hole which receives the shaft 56. A hole 66' is provided to receive the pin 68 which is a part of or rigidly attached to an arm 69. This arm is actuated by a spring 70 which is anchored to a post 71 suitably secured in lug 1'. The hole 66' is larger than pin 68 to provide for the aforementioned movement of the escapement pawl 66. An adjusting screw 72 seen in Figs. 12 and 13 is threaded into a bent over upper portion of the arm 69 which is located in position by means of a check nut 73. The lower end of this screw is rounded and is held in contact with a bent under portion of arm 57 by a tension of spring 70. This screw 72 is adjustable so that the escapement pawl may be timed to withdraw or lower from contact with a racked tooth immediately after the engagement of the stop pawl 49. Owing to the tension exerted by spring 67 and the enlarged holes in the escapement pawl 66 for the shaft 56 and the pin 68 the toothed end will jump over the apex of the racked tooth when released from contact with its face. This insures its engagement with the racked tooth immediately following instead of returning into engagement with the same tooth. I provide for moving the card from one group of holes to one of the following groups without operating the punches by use of a tabulating mechanism. In this mechanism the component parts such as key lever and rocker are similar to those used for operating the punches, except in this attachment the punch is omitted.

Figures 9, 10, 11:
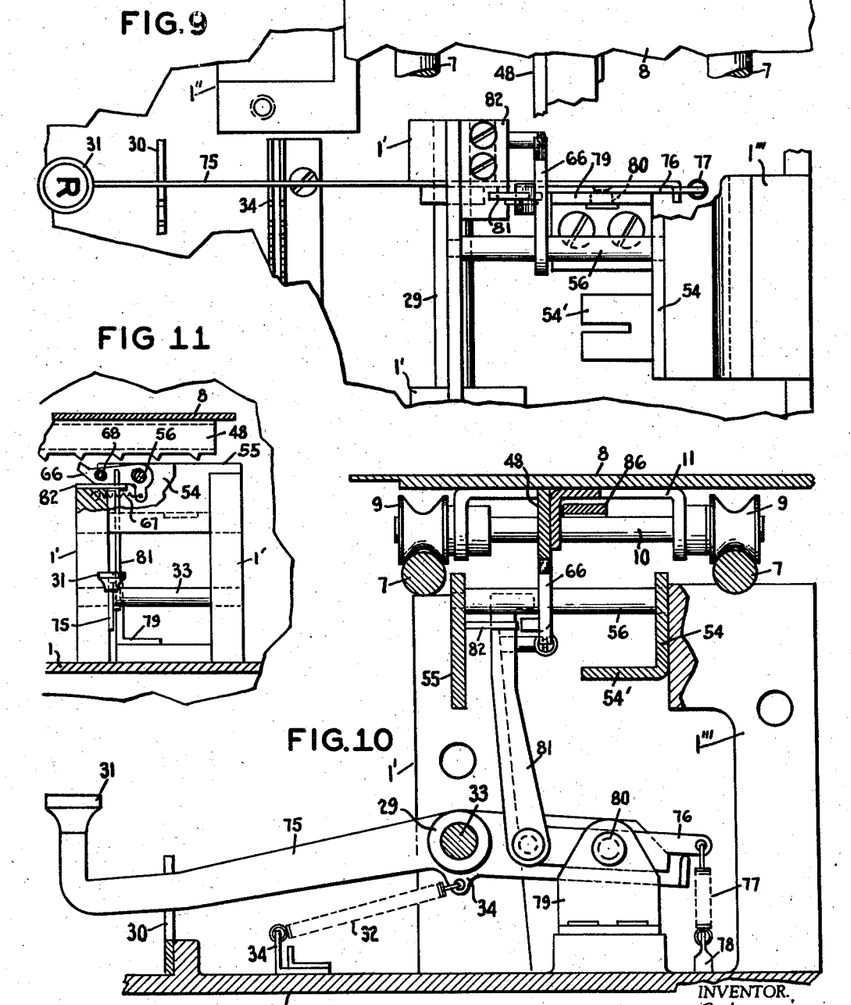
Fig. 9 is a fragmentary plan view of the release key and mechanism for moving the table carriage its maximum distance without operating any punches.
Fig. 10 is a fragmentary sectional view of the same.
Fig. 11 is a fragmentary front elevation partly in section of the release key and escapement pawl.

The release key 75 is arranged for reverse motion at the rear by contacting with rocker 76. This rocker is held in contact by means of a tension spring 77 which is attached to a spring post 78 preferably screwed into the base 1. The rocker 76 is rigidly attached to a shaft 80 which is pivotally mounted in a bearing bracket 79 which is rigidly secured to the base 1. By depressing a release key 75, the forward end of the rocker 76 is lowered. The release hook 81 is pivotally secured to the forward end of rocker 76 and is guided in a slot plate 82 which may be attached by means of screws to the post 1' of the machine as shown in Figs. 9 and 10. The upper end of the release hook 81 is hooked and adapted to engage the bent under portion of the escapement pawl 66 so as to withdraw it from engagement with the rack tooth 48.

It will be apparent from the foregoing description that the depression of the release key 75 will permit the card table 8 to be moved freely either to the right or left hand.

Figure 2:
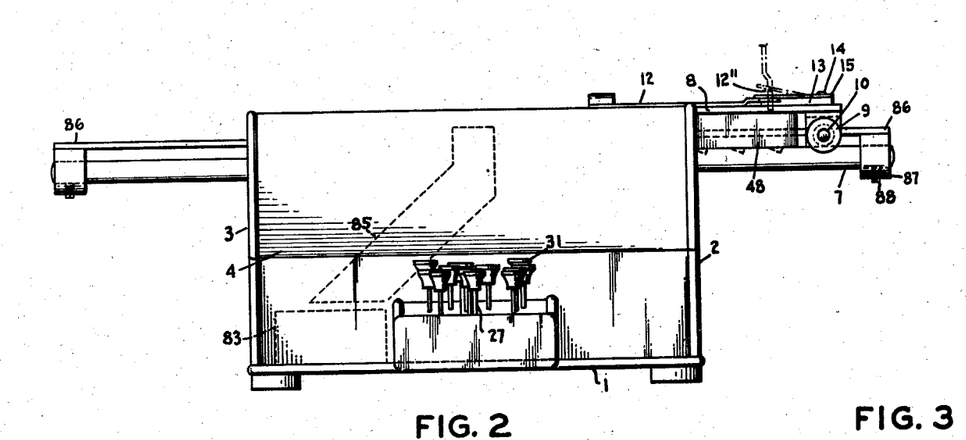
Fig. 2 is a front elevation showing in dotted lines the paper punchings, chute and drawer.
Figure 3:
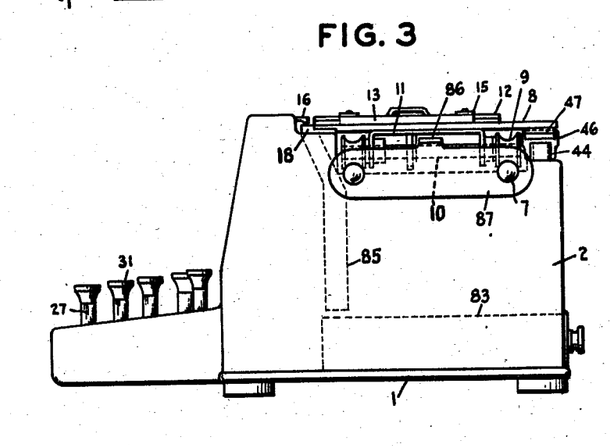
Fig. 3 is an end elevation looking from the right side and showing in dotted lines paper punchings, chute and drawer.

It has been found in practice that the portions of the cards notched out tend to get into the operating mechanism and this necessitates frequent cleaning of the machine or in some cases prevents its satisfactory operation. I overcome this by providing means to direct the punching into a drawer 83 which is arranged to be inserted from the rear, the drawer being provided with a suitable knob for its convenient removal. The drawer is arranged to be in register with a chute 85 which slopes rearwardly and is mounted back of the punch plate 21 to which it may be attached by means of screws. A convenient means for accomplishing this is by providing a left extending plate which forms the front of the chute as shown in Figs. 1, 2, 3.

The sloping angular shape of the chute will guide the punches from the punching position to the center of the drawer. In order to prevent the table 8 moving from the track 7, I locate a flattened rail 86 under the table and slightly above the axle 10. This rail is supported at both ends by cross pieces 87 which may be secured to the tracks 7 by means of set screws 88 and to the rail 86 by a bevel headed screw 89. A foot of rubber or other suitable material may be suitably secured to each corner.

While I have described with some degree of particularity my invention, it should be understood that this description and the accompanying drawings are solely for illustrative purposes and to show a preferred embodiment of my invention, but is not intended to act as a limitation and I do not wish to be understood as limiting myself to the specific structure described in the specification and shown in the drawings except as such limitations may appear in the hereinafter appended claims.

Having described my invention what I regard as new and desire to secure by Letters Patent is—

1. In a device of the class described for notching a card, said card having a plurality of holes adjacent its margin, said holes being arranged in numbered groups, a plurality of punches adapted to notch the edges of said card, keys to actuate a selected number of said punches, a reciprocating card table, spring means which presses upon the surface of the card to hold said card on said table, manually operative means to shift the position of said card and table.

2. In a device of the class described for notching a card, said card having a plurality of holes adjacent its margin, said holes being arranged in numbered groups, a plurality of punches adapted to notch the edges of said card, keys to actuate a selected number of said punches, a reciprocating card table, spring means which presses upon the surface of the card to hold said card on said table, manually operative means to shift the position of said card and table, a track on which said table slides, and means to hold said table on said track.

3. In a device of the class described for notching a card, said card having a plurality of holes adjacent its margin, said holes being arranged in numbered groups, a plurality of punches adapted to notch the edges of said card, a plurality of numbered keys to cause said punches to notch said cards from said holes to their edges, said keys in arrangement to actuate a combination of said punches whereby the numerals designating the notched holes when read from left to right will furnish the desired number.

4. In a device of the class described for notching a card, said card having a plurality of holes adjacent its margin, said holes being arranged in numbered groups, a plurality of punches adapted to notch the edges of said card, keys to actuate a selected number of said punches, a reciprocating card table, spring means which presses upon the surface of the card to hold said card on said table manually operative means to shift the position of said card and table, a track on which said card table slides, means to hold said table on said track, and means to release said shifting means.

5. In a device of the class described for notching a card bearing numbered groups adjacent its edge, a plurality of punches adapted to notch the edges of said cards, a plurality of keys in arrangement to actuate a combination of said punches, the sum of which will be the desired number whereby said cards may be notched for any desired combination of numbers.

6. In a device of the class described for notching a card bearing numbered groups adjacent its edge, a plurality of punches adapted to notch the edges of said cards, a plurality of keys in arrangement to actuate a combination of said punches the sum of which will be the desired number, whereby said cards may be notched for any desired combination of numbers, and means to shift the cards to bring each under the desired combination of punches.

7. In a device of the class described for notching a card, to be notched, said card having a plurality of holes adjacent its margin, said holes being arranged in numbered groups, a plurality of punches adapted to notch the edges of said card, a plurality of numbered keys in arrangement to actuate a combination of said punches, to cause them to notch said card from certain of said holes to their edges whereby the numerals designating the notched holes when read from left to right will furnish the desired number, and means to guide said keys to ensure their engagement with said punches.

8. In a device of the class described for notching a card, said card having a plurality of holes adjacent its margin, said holes being arranged in numbered groups, a plurality of punches adapted to notch the edges of said card, keys to actuate a selected number of said punches, a reciprocating card table, spring means which presses upon the surface of the card to hold said card on said table, manually operative means to shift the position of said card and table, spring means to hold said keys normally out of engagement with said punches.

9. In a device of the class described for notching a card, said card having a plurality of holes adjacent its margin, said holes being arranged in numbered groups, a plurality of punches adapted to notch the edges of said card, a plurality of numbered keys in arrangement to actuate a combination of said punches, to cause them to notch said card from certain of said holes to their edges whereby the numerals designating the notched holes when read from left to right will furnish the desired number, spring means to hold said keys normally out of engagement with said punches.

10. In a device of the class described for notching a card bearing numbered groups adjacent its edge, a plurality of punches adapted to notch the edges of said cards, a plurality of keys in arrangement to actuate a combination of said punches, the sum of which will be the desired number whereby said cards may be notched for any desired combination of numbers, and means to shift said table and card from one group of members to another.

11. In a device of the class described for notching a card bearing numbered groups adjacent its edge, a plurality of punches adapted to notch the edges of said cards, a casing, a plurality of keys in arrangement to actuate a combination of said punches, the sum of which will be the desired number, whereby said cards may be notched for any desired combination of numbers, means to shift the cards to bring it under the desired combination of punches, automatically operated spring means to hold said carriage at one side of said casing.

12. In a device of the class described for notching a card bearing numbered groups adjacent its edge, a plurality of punches adapted to notch the edges of said cards, certain of said keys being adapted to directly engage one of said punches, others of said keys being adapted to engage a combination of the punches.

13. In a device of the class described for notching a card bearing numbered groups adjacent its edge, a plurality of punches adapted to notch the edges of said cards, a plurality of keys in arrangement to actuate a combination of said punches, the sum of which will be the desired number, whereby said cards may be notched for any desired combination of numbers, and means to shift the cards to bring each under the desired combination of punches, springs to hold said punches normally in a raised position and springs to hold said keys normally out of engagement with said punches.

14. In a device of the class described for notching a card, said card having a plurality of holes adjacent its margin, said holes being arranged in numbered groups, a plurality of punches adapted to notch the edges of said card by being moved downwardly, keys to actuate a selected number of said punches, means actuated by the depression of a key to move corresponding punches downwardly, a reciprocating card table, spring means which presses upon the surface of the card to hold said card on said table, manually operative means to shift the position of said table with the card in position.

15. In a device of the class described for notching a card, said card having a plurality of holes adjacent its margin, said holes being arranged in numbered groups, a plurality of punches adapted to notch the edges of said card adapted to notch said cards by being moved downwardly, keys to actuate a selected number of said punches, means actuated by the depression of a key to move corresponding punches downwardly, a reciprocating card table, spring means which presses upon the surface of the card to hold said card on said table, manually operative means to shift the position of said table with the card in position, and means to hold said punches normally in an elevated position.

16. In a device of the class described for notching a card bearing numbered groups adjacent its edge, a plurality of punches adapted to notch the edges of said cards, certain of said keys being adapted to directly engage one of said punches, others of said keys being adapted to engage a combination of the punches, and means to equalize the pressure required to actuate said keys.

17. In a device of the class described for notching a card bearing numbered groups adjacent its edge, a plurality of punches adapted to notch the edges of said cards, a plurality of keys in arrangement to actuate a combination of said punches, the sum of which will be the desired number whereby said cards may be notched for any desired combination of numbers, and means to shift the card and table after one group has been notched to another group to be notched.

18. In a device of the class described for notching a card, said card having a plurality of holes adjacent its margin, said holes being arranged in numbered groups, a plurality of punches adapted to notch the edges of said card, keys to actuate a selected number of said punches, a reciprocating card table, spring means which presses upon the surface of the card to hold said card on said table, rigid means to hold said card in position to register with said punches, and manually operative means to shift the position of said table with the card in position.

19. In a device of the class described for notching a card, said card having a plurality of holes adjacent its margin, said holes being arranged in numbered groups, a plurality of punches adapted to notch the edges of said card, keys to actuate a selected number of said punches, a reciprocating card table, spring means which presses upon the surface of the card to hold said card on said table, rigid means to hold said card in position to register with said punches, manually operative means to shift the position of said table with the card in position, said means comprising an escapement actuated by a separate key.

DONALD A. NEVIN.